(12) United States Patent
Wu et al.

(10) Patent No.: US 9,359,483 B2
(45) Date of Patent: Jun. 7, 2016

(54) HYBRID CARBON BLACK, COATING COMPOSITION AND SHIELDING MATERIAL EMPLOYING THE SAME

(71) Applicant: INDUSTRIAL TECHNOLOGY RESEARCH INSTITUTE, Chutung, Hsinchu (TW)

(72) Inventors: Ching-Mao Wu, Keelung (TW); Szu-Yin Lin, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 22 days.

(21) Appl. No.: 14/582,481

(22) Filed: Dec. 24, 2014

(65) Prior Publication Data

US 2015/0183950 A1    Jul. 2, 2015

(30) Foreign Application Priority Data

Dec. 27, 2013   (TW) .............................. 102148616 A

(51) Int. Cl.
| | | |
|---|---|---|
| *C09C 1/56* | (2006.01) | |
| *C08K 9/08* | (2006.01) | |
| *C08K 3/04* | (2006.01) | |
| *C09D 125/08* | (2006.01) | |

(52) U.S. Cl.
CPC ... *C08K 3/04* (2013.01); *C09C 1/56* (2013.01); *C09D 125/08* (2013.01); *C08K 9/08* (2013.01)

(58) Field of Classification Search
CPC .............. C09C 1/56; C08K 3/04; C08K 9/08; C09D 125/08
See application file for complete search history.

(56) References Cited

U.S. PATENT DOCUMENTS

| | | | |
|---|---|---|---|
| 2,700,185 A | 1/1955 | Lee | |
| 3,515,664 A * | 6/1970 | Johnson | B01D 57/02 204/627 |
| 5,747,577 A | 5/1998 | Gerroir et al. | |
| 6,197,274 B1 | 3/2001 | Mahmud et al. | |
| 6,372,349 B1 | 4/2002 | Hisashi et al. | |
| 6,376,577 B2 | 4/2002 | Kniess et al. | |
| 6,417,283 B1 | 7/2002 | Ikeda et al. | |
| 6,458,458 B1 * | 10/2002 | Cooke | C08K 9/08 428/403 |
| 8,088,718 B2 | 1/2012 | Bicerano et al. | |
| 8,435,425 B2 | 5/2013 | Unagami et al. | |
| 2005/0012979 A1 * | 1/2005 | Minami | G02B 26/004 359/296 |
| 2008/0026221 A1 | 1/2008 | Vincent et al. | |
| 2011/0312859 A1 | 12/2011 | Bicerano | |

OTHER PUBLICATIONS

Ehrburger-Dolle, et al., Pure & Appl. Chem., vol. 65, No. 10, pp. 22223-2230 (1993).*
Landfester et al., "Evidence for the preservation of the particle indentity in miniemulsion polymerization", Macromol, Rapid Commun., 1999, vol. 20, No. 2, pp. 81-84.
Steiert et al., "Encapsulation of Organic Pigment Particles Via Miniemulsion Polymerization", Macromolecular Materials and Engineering, 2007, vol. 292, pp. 1111-1125.
Tiarks et al., "Encapsulation of Carbon Black by Miniemulsion Polymerization", Macromolecular Chemistry and Physics, 2001, vol. 202, No. 1, pp. 51-60.
Wen et al., "Pigment-based tricolor ink particles via mini-emulsion polymerization for chromatic electrophoretic displays", Journal of Materials Chemistry, 2010, vol. 20, pp. 8112-8117.
Han et al., "Surface Modification of Carbon Black by Oleic Acid for Miniemulsion Polymerization of Styrene", Macromolecular Research, vol. 18, No. 5, pp. 435-436, Dec. 31, 2010.

* cited by examiner

*Primary Examiner* — Vickey Nerangis
(74) *Attorney, Agent, or Firm* — Birch, Stewart, Kolasch & Birch, LLP

(57) ABSTRACT

A hybrid carbon black, a coating composition, and a shielding material employing the same are provided. The hybrid carbon black includes a core of carbon black, and a cross-linked network polymer film covering the whole surface of the carbon black overall. In particular, the carbon black core has a mass fractal dimension between 2 and 3 and a surface fractal dimension between 2 and 2.5, and the cross linking network polymer film includes a product obtained by crosslinking a composition including a styrene monomer and a divinylbenzene monomer.

13 Claims, 1 Drawing Sheet

HYBRID CARBON BLACK, COATING COMPOSITION AND SHIELDING MATERIAL EMPLOYING THE SAME

CROSS REFERENCE TO RELATED APPLICATION

This application is based upon and claims the benefit of priority from the prior Taiwan Patent Application No. 102148616, filed on 27 Dec. 2013, the entire contents of which are incorporated herein by reference.

TECHNICAL FIELD

The disclosure relates to a hybrid carbon black, a coating composition, and a shielding material employing the same.

BACKGROUND

At present, a light-shielding border is apt to be disposed on the surface of a touch panel, wherein the light-shielding border can be a black matrix photoresist layer. The black matrix photoresist layer is formed by providing a composition including carbon black dispersed within a photosensitive resist, coating the composition on a glass substrate, and subjecting the composition to a lithography process (i.e. soft baking, exposure, development, and hard baking). Although carbon black has advantages such as low cost and high blackness, the black matrix photoresist layer including carbon black exhibits low surface resistance after hard baking with high temperatures, and thus resulting in short circuits among wire traces disposed on the border and a distortion of the signal due to the electrical conductivity of carbon black.

Therefore, a novel carbon black with insulating surfaces for use in the black matrix photoresist layer is desired.

SUMMARY

According to an embodiment of the disclosure, the disclosure provides a hybrid carbon black including a core of carbon black, and a cross-linked network polymer film covering the whole surface of the carbon black overall. In particular, the core of carbon black has a mass fractal dimension (Dm) between 2-3, and a surface fractal dimension (Ds) between 2-2.5. Furthermore, the cross-linked network polymer film includes a product obtained by crosslinking a composition including a styrene monomer and a divinyl benzene monomer. According to another embodiment of the disclosure, the cross-linked network polymer film consists of a product obtained by crosslinking a composition including a styrene monomer and a divinyl benzene monomer.

According to some embodiments of the disclosure, the disclosure also provides a coating composition including a solvent; and a hybrid carbon black. The hybrid carbon black includes a core of carbon black, and a cross-linked network polymer film covering the whole surface of the carbon black overall. In particular, the core of carbon black has a mass fractal dimension (Dm) between 2-3, and a surface fractal dimension (Ds) between 2-2.5. Furthermore, the cross-linked network polymer film includes a product obtained by crosslinking a composition including a styrene monomer and a divinyl benzene monomer. According to another embodiment of the disclosure, the cross-linked network polymer film consists of a product obtained by crosslinking a composition including a styrene monomer and a divinyl benzene monomer.

According to other embodiments of the disclosure, a shielding material is provided. The shielding material includes a layer, wherein the layer includes a hybrid carbon black. The hybrid carbon black includes a core of carbon black, and a cross-linked network polymer film covering the whole surface of the carbon black overall. In particular, the core of carbon black has a mass fractal dimension (Dm) between 2-3, and a surface fractal dimension (Ds) between 2-2.5. Furthermore, the cross-linked network polymer film includes a product obtained by crosslinking a composition including a styrene monomer and a divinyl benzene monomer. According to another embodiment of the disclosure, the cross-linked network polymer film consists of a product obtained by crosslinking a composition including a styrene monomer and a divinyl benzene monomer.

A detailed description is given in the following embodiments with reference to the accompanying drawings.

DETAILED DESCRIPTION

Figure 1:
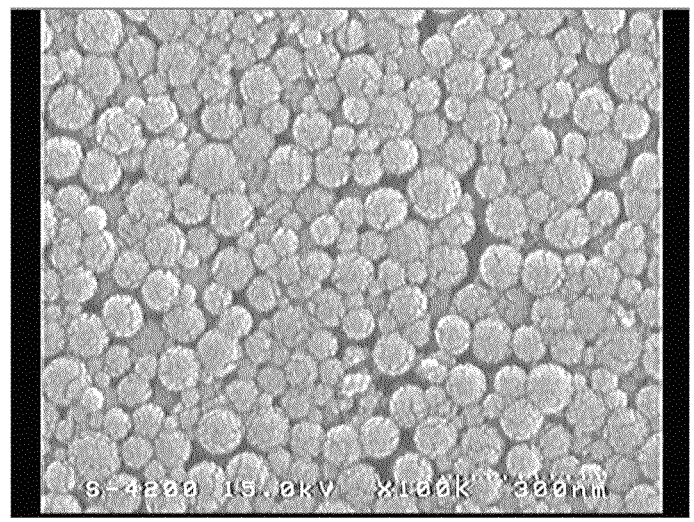
FIG. 1 is a scanning electron microscope (SEM) photograph of the hybrid carbon black disclosed in Example 1.

The following description is of the best-contemplated mode of carrying out the disclosure. This description is made for the purpose of illustrating the general principles of the disclosure and should not be taken in a limiting sense. The scope of the disclosure is best determined by reference to the appended claims.

The disclosure provides a hybrid carbon black with a cross-linked network polymer film and applications thereof. Since the hybrid carbon black of the disclosure has the advantages of high pyrolysis temperature ($\geq 380°$ C.) and high solvent-resistant strength, the hybrid carbon black used in a shielding material will not easily decompose at a high operating temperature, and thus the surface of the carbon black of the hybrid carbon black is not left exposed, and the hybrid carbon black maintains electrical isolation. When the hybrid carbon black of the disclosure is mixed with a solvent to obtain a composition (such as an ink), the cross-linked network polymer film of the hybrid carbon black would become swollen by the solvent, rather than dissolved by the solvent. The hybrid carbon black of the disclosure includes a core of carbon black and a cross-linked network polymer film covering the whole surface of the carbon black overall, wherein the core of carbon black has a compact fractal morphology.

The compact fractal morphology of the core of carbon black can be characterized by the fractal dimensions including a mass fractal dimension (Dm) and a surface fractal dimension (Ds). The surface fractal dimension (Ds) reflects the surface roughness of the fractal, and the core of carbon black of the disclosure can have a surface fractal dimension (Ds) defined by the following equation: $2 \leq Ds \leq 3$. When the core of carbon black has a low surface fractal dimension, the core of carbon black has a smooth fractal surface. On the other hand, when the core of carbon black has a high surface fractal dimension, the core of carbon black has a rough fractal surface. The mass fractal dimension (Dm) reflects the aggregation morphology of the fractal, and the core of carbon black of the disclosure can have a mass fractal dimension (Dm) defined by the following equation: $1 < Dm < 3$. When the core of carbon black has a low mass fractal dimension, the core of carbon black has a linear aggregation morphology. On the other hand, when the core of carbon black has a high mass fractal dimension, the core of carbon black has a compact fractal morphology (closed spherical morphology). In an embodiment of the disclosure, the core of carbon black can have a mass fractal dimension (Dm) between 2-3 and a surface fractal dimension (Ds) between 2-2.5. Therefore, the core of carbon black can have a compact fractal morphology and a very smooth surface.

In an embodiment of the disclosure, the cross-linked network polymer film can include a cross-linked copolymer prepared by reacting a monomer with high thermal resistance and a multifunctional monomer serving as a crosslinking agent via a copolymerization and cross-linking.

The monomer with high thermal resistance can include unsaturated vinyl monomer. The unsaturated vinyl monomer can include styrene monomer, methacrylate monomer (such as methyl methacrylate, benzyl methacrylate, ethyl methacrylate, 2-hydroxyethyl methacrylate, hydroxypropyl methacrylate, or isobutyl methacrylate), or acrylate monomer (such as methyl acrylate, benzyl acrylate, ethyl acrylate, 2-hydroxyethyl acrylate, hydroxypropyl acrylate, or isobutyl acrylate). The unsaturated vinyl monomer is apt to be adsorbed on the surface of carbon black due to the interaction therebetween. Furthermore, the unsaturated vinyl monomer can further have a cyclic functional group (such as cycloalkyl group or aromatic cyclic group), in order to enhance the pyrolysis temperature of the cross-linked network polymer film. The unsaturated vinyl monomer having cyclic functional group can be styrene, benzyl methacrylate, or benzyl acrylate. According to an embodiment of the disclosure, the monomer with high thermal resistance is styrene. On the other hand, the multifunctional monomer serving as a crosslinking agent can have at least two polymerizable unsaturated vinyl bonds. The multifunctional monomer serving as a crosslinking agent can be divinyl benzene, ethylene glycol dimethacrylate, 1,4-butanediol diacrylate, pentaerythritol triacrylate, ethoxylated trimethylpropane triacrylate, dipentaerythritol pentaacrylate, ethoxylated pentaerythritol tertaacrylate, pentaerythritol tertaacrylate, dipentaerythritol hexaacrylate, or a combination thereof. According to an embodiment of the disclosure, the multifunctional monomer serving as a crosslinking agent is divinylbenzene.

In an embodiment of the disclosure, the composition used for preparing the cross-linked network polymer film can further include a hydrophobic short-chain unsaturated vinyl monomer, in order to reduce the viscosity and increase the dispersibility of the composition.

The hydrophobic short-chain unsaturated vinyl monomer is not limited in the disclosure, and can be alkyl acrylate such as lauryl acrylate (LA), methyl acrylate, ethyl acrylate, n-butyl acrylate, methyl methacrylate, ethyl methacrylate, n-butyl methacrylate, octadecyl methacrylate, 2-ethylhexyl acrylate, urethane acrylate, epoxy acrylate, tridecyl acrylate, or a combination thereof.

The method for fabricating the hybrid carbon black with a cross-linked network polymer film can include subjecting carbon black to a pulverizing treatment and coating a cross-linked network polymer on the treated carbon black.

The pulverizing treatment of the carbon black includes the following steps. First, a carbon black dispersion is prepared via a grinding process. The grinding process can include a ball milling, sand-milling, or high-speed impact mill. In an embodiment of the disclosure, the carbon black is pulverized by a nano-grinding process, in order to force the obtained carbon black (core of carbon black) having a specific mass fractal dimension (Dm) and surface fractal dimension (Ds).

According to other embodiment of the disclosure, the pulverizing treatment of the carbon black includes the following steps.

First, a bare carbon black is provided and then washed with tetrahydrofuran (THF) several times to remove the surface dirt of the carbon black. Next, the carbon black, first surfactant, and water are mixed to obtain a carbon black/first surfactant/water dispersion (with a solid content between 9-15 wt %). After stirring at 50-100 rpm for 20-30 mins, the dispersion is subjected to a nano-grinding process by a nano-grinding mill. The nano-grinding process can employ ceramic grinding beads (such as spherical zirconium oxide beads with a high-density, high hardness, high stability, and high abrasion resistance), or steel grinding beads (such as tempering steel beads, chrome-steel alloy beads, or hardened bearing steel beads), having a diameter less than or equal to 0.1 mm. The nano-grinding process has a process temperature between 15-25° C. The nano-grinding process has an initial rate of 500-1500 rpm and a desired rate of 1500-2500 rpm. The nano-grinding process is carried out until that the particle size change was reduced to within a prescribed range. After the nano-grinding process, the dispersion can be centrifuged, and the centrifuged solid was washed with methanol several times. After drying at a low pressure, a fine carbon black powder can be obtained. The fine carbon black powder is used to form the hybrid carbon black of the disclosure. When the diameter of the grinding beads is too large (such as larger than 0.1 mm), the ground carbon black would have a large particle size and a broad particle size distribution. When the grinding rate of the nano-grinding process is too high, the wetting ability provided by the surfactant would be poor, resulting in excessive wear. Conversely, when the grinding rate of the nano-grinding process is too low, the collision force between the carbon black is reduced, resulting in poor grinding performance. The first surfactant serves as a dispersant for dispersing and stabilizing the carbon black in water. Therefore, in the subsequent process, the monomers can be stably adsorbed by the carbon black, thereby facilitating the formation of the cross-linked network polymer film covering on the surface of the carbon black.

The use of the first surfactant is not limited in the disclosure. The first surfactant can be an ionic surfactant (e.g. anionic surfactant, cationic surfactant), non-ionic surfactant, or polymeric surfactant, such as sodium dodecyl sulfate (SDS). Furthermore, the dispersion can further include a second surfactant (the second surfactant is different from the first surfactant) such as a hydrophobic surfactant, in order to suppress Ostwald ripening of the micelle composed of the surfactant, monomer composition, and carbon black, and prevent the carbon black from having a broad particle size distribution. The use of the second surfactant is not limited, and can be a surfactant compatible with the first surfactant, such as hexadecane.

In an embodiment of the disclosure, the method for fabricating the hybrid carbon black further includes preparing a carbon black dispersion by adding the aforementioned pulverized carbon black into an aqueous solution having a surfactant, wherein the particle size of the pulverized carbon black can be between 80-150 nm. When the particle size of the carbon black is too large, the dispersion would have a low optical density resulting in reducing the shielding effect, due to the poor stability of the carbon black. On the other hand, when the particle size of the carbon black is too small, the viscosity of the composition is increased resulting in difficulties in the subsequent coating process. The ratio between the carbon black, surfactant, and water can be 1.0-1.5:0.2-0.4:6-10. After stirring, a uniform carbon black dispersion is obtained. Next, a solution having an initiator, an unsaturated vinyl monomer, and a multifunctional monomer is prepared. After stirring, the solution is added in one portion or dropwise added into the carbon black dispersion. It should be noted that, after addition, the mixture is stirred for a period of time (such as 30-40 mins) in order to facilitate the monomer passing into the carbon black micelle and being adsorbed onto the surface of the carbon black. Next, the mixture is subjected to polymerization. The polymerization of the mixture can be a photo-polymerization or thermal polymerization according to the type of the initiator. The initiator can be a photo-initiator or a thermal initiator. For example, when a thermal initiator is employed, the mixture undergoes a polymerization over the pyrolysis temperature (such as 65-70° C.). Furthermore, the mixture can be heated to 75-85° C. for completely converting the monomer to the polymer. The polymerization can have a reaction time of 2-20 hrs. When the reaction temperature of the polymerization is too high, the initiator would immediately decompose resulting in a cross-reaction of the monomer and the micelle of the carbon black. On the other hand, when the reaction temperature of the polymerization is too low, the initiator would not be fragmented by pyrolysis. It should be noted that the fragments of the thermal initiator cannot increase the electrical conductivity of the cross-linked network polymer film, in order to ensure that the obtained hybrid carbon black maintains electrical isolation. Accordingly, the use of the thermal initiator depends on the characteristics of the monomers. The molar ratio between the unsaturated vinyl monomer and the multifunctional monomer is between 10-100. When the molar ratio is too high, the obtained polymer has a lower degree of cross-linkage. When the molar ratio is too low, the obtained polymer exhibits low thermal resistance.

The unsaturated vinyl monomer can be styrene, benzyl methacrylate, benzyl acrylate, or a combination thereof. The multifunctional monomer can have at least two polymerizable unsaturated vinyl bonds. The multifunctional monomer can be divinyl benzene, ethylene glycol dimethacrylate, 1,4-butanediol diacrylate, pentaerythritol triacrylate, ethoxylated trimethylpropane triacrylate, dipentaerythritol pentaacrylate, ethoxylated pentaerythritol tertaacrylate, pentaerythritol tertaacrylate, dipentaerythritol hexaacrylate, or a combination thereof. The thermal initiator is not limited and can be 2,2'-azodi-isobutyronitrile (AIBN). The surfactant is not limited and can be an ionic surfactant (e.g. anionic surfactant, cationic surfactant), non-ionic surfactant, or polymeric surfactant. The surfactant, for example, can be sodium dodecyl sulfate (SDS) which has a high hydrophilic-lipophilic balance (HLB) number. After polymerization, methanol is added into the dispersion, and the mixture is centrifuged. After centrifugation, the precipitate is collected, and then mixed with methanol to perform a centrifugation again. The above step is repeated several times to ensure that the surfactant is removed completely. Next, the precipitate is collected and dried at a low pressure, obtaining the powdery carbon black covered with a cross-linked network polymer film. The weight ratio of the cross-linked network polymer film and the core of carbon black is between 5-30. When the weight ratio is too high, the cross-linked network polymer film has a lower optical density. On the other hand, when the weight ratio is too low, the hybrid carbon black exhibits low electrical resistance. Furthermore, the ratio between the thickness of the cross-linked network polymer film and the particle size of the core of carbon black is between 0.1-1.0.

The solution having the initiator, the unsaturated vinyl monomer, and the multifunctional monomer can include a hydrophobic short-chain unsaturated vinyl monomer. The hydrophobic short-chain unsaturated vinyl monomer can be alkyl acrylate such as lauryl acrylate (LA), methyl acrylate, ethyl acrylate, n-butyl acrylate, methyl methacrylate, ethyl methacrylate, n-butyl methacrylate, octadecyl methacrylate, 2-ethylhexyl acrylate), urethane acrylate, epoxy acrylate, or tridecyl acrylate. The molar ratio between the unsaturated vinyl monomer and the hydrophobic short-chain unsaturated vinyl monomer can be between 10-30. When the molar ratio is too high, a black photoresist film obtained by coating and curing the carbon black dispersion would have a higher thickness due to the high viscosity of the carbon black dispersion. On the contrary, when the molar ratio is too low, a black photoresist film obtained by coating and curing the carbon black dispersion would have a lower thickness due to the low viscosity of the carbon black dispersion.

According to embodiments of the disclosure, the disclosure also provides a coating composition. The coating composition includes a solvent, and the aforementioned hybrid carbon black. The coating composition has a solid content between 10-60 wt %. Herein, the solvent of the coating composition is not limited and can be a solvent which the hybrid carbon black can be uniformly dispersed thereinto. The solvent can be propylene glycol monomethyl ether acetate (PG-MEA), cyclohexanone, propylene glycol, or propylene glycol methyl ether (PGME). Furthermore, the coating composition can further include a dispersant such as BYK191. In particular, the dispersant has a weight percentage of 1-30%, based on the total weight of the solvent and the hybrid carbon black.

According to embodiments of the disclosure, the disclosure also provides a shielding material, wherein the shielding material includes a layer. The layer includes the hybrid carbon black of the disclosure. According to an embodiment of the disclosure, the shielding material has a surface resistance larger than or equal to $10^{10}$ $\Omega/cm^2$.

The following examples are intended to illustrate the disclosure more fully without limiting the scope, since numerous modifications and variations will be apparent to those skilled in this art.

Preparation of Fine Carbon Black

Preparation Example 1

First, bare carbon black (commercially-acquired from Mitsubishi Chemical Corp with a trade No. MA100R) was provided and then washed by tetrahydrofuran (THF) several times to remove the surface dirt of the carbon black. Next, the carbon black, sodium dodecyl sulfate (SDS) (commercially-acquired from ACROS) serving as a dispersant, and water were mixed to obtain a carbon black/SDS/water dispersion (with a solid content of 13 wt %). After stirring at 50 rpm for 30 mins, the dispersion was subjected to a nano-grinding process at 20° C. (employing 0.1 mm zirconium beads) by a nano-grinding mill (Just Nano, JBM-B035 (batchType)). The nano-grinding process had an initial rate of 500 rpm and a desired rate of 2000 rpm. The nano-grinding process was carried out until the particle size change was reduced to within a predetermined range. After the nano-grinding process, the dispersion was centrifuged, and the centrifuged solid was washed with methanol several times. After drying at a low pressure, a fine carbon black was obtained. After measurement, the obtained fine carbon black had an average particle size about 124 nm, a mass-fractal dimension (Dm) of about 2.1, and a surface-fractal dimension (Ds) of about 2.0. As a result, the obtained fine carbon black had compact fractal morphology and a very smooth surface. The particle size and zeta potential measurements were done with high concentration particle size, zeta potential and molecular weight laser sizer (Malvern Zetasizer Nano ZS). The morphology of the carbon black was measured by small angle X-ray scattering (Bruker Nanostar SAXS).

Preparation Example 2

Preparation Example 2 was performed the same way as Preparation Example 1, except that bare carbon black with trade No. MOGUL L Lot-1315415 (commercially-acquired from Cabot) was substituted for MA100R. After measurement, the obtained fine carbon black had an average particle size about 109 nm, a mass-fractal dimension (Dm) of about 2.3, and a surface-fractal dimension (Ds) of about 2.0. As a result, the obtained fine carbon black had a compact fractal morphology and a very smooth surface.

Comparative Preparation Example 1

First, bare carbon black (commercially-acquired from Mitsubishi Chemical Corp with a trade No. MA100R) was provided and then washed by tetrahydrofuran (THF) several times to remove the surface dirt of the carbon black. Next, the carbon black, sodium dodecyl sulfate (SDS) (commercially-acquired from ACROS) serving as a dispersant, and water were mixed to obtain a carbon black/SDS/water dispersion (with a solid content of 13 wt %).

The dispersion was subjected to an ultrasonic vibration treatment at 50° C. for 30 mins. After drying at a low pressure, a fine carbon black was obtained. After measurement, the obtained fine carbon black had an average particle size about 109 nm, a mass-fractal dimension (Dm) of about 1.7, and a surface-fractal dimension (Ds) of about 2.5. As a result, the fine carbon black treated by an ultrasonic vibration treatment had a low-dimensional aggregation morphology and has a moderately rough surface.

Preparation of Hybrid Carbon Black

Example 1

100 g of DI water, 1.0 g of fine carbon black (obtained by Preparation Example 1), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.05 g of azobisisobutyronitrile (AIBN) (having a purity of 99%, commercially-acquired from Showa), 0.103 g of hexadecane (having a purity of 94%, commercially-acquired from Alfa Aesar), 10.0 g of styrene (commercially-acquired from ACROS), and 0.18 g of 1,2-divinylbenzene (DVB) (having a purity of 98%, commercially-acquired from TCI) were added in a second reaction bottle, and then stirred to obtain a solution. The solution was added into the first reaction bottle to be mixed with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having cross-linked network poly(styrene-co-DVB) shell dispersion. After measurement, the dispersion had a solid content of 9.49 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having cross-linked network poly(styrene-co-DVB) shell was obtained, wherein the particle size of the hybrid carbon black is 116 nm. The components, amounts thereof, and characteristics of the obtained hybrid carbon black are shown in Table 1. FIG. 1 is a scanning electron microscope (SEM) photograph of the hybrid carbon black. As shown in FIG. 1, the hybrid carbon black has a uniform particle size and distribution.

Example 2

100 g of DI water, 1.0 g of fine carbon black (obtained by Preparation Example 1), and 1.4 g of surfactant SDS (having a purity of 90%, sold and manufactured by ACROS) were added into a first reaction bottle. The mixture was stirred with a stirring bar for 0.5 hr, and then stirred with a mechanical stirrer for 1 hr, obtaining a carbon black dispersion. Next, 0.05 g of azobisisobutyronitrile (AIBN) (having a purity of 99%, commercially-acquired from Showa), 1.08 g of lauryl acrylate (LA) (having a purity of 90%, commercially-acquired from Aldrich), 10.57 g of styrene (commercially-acquired from ACROS), and 0.25 g of 1,2-divinylbenzene (DVB) (having a purity of 98%, commercially-acquired from TCI) were added in a second reaction bottle, and then stirred to obtain a solution. The solution was added into the first reaction bottle to mix with the carbon black dispersion. After stirring for 0.5 hr, the mixture was heated at 65° C. under nitrogen atmosphere for 1 hr and then heated to 75° C. and stirred at 350 rpm for 16 hrs, obtaining a hybrid carbon black having cross-linked network poly(styrene-co-DVB-co-LA) shell dispersion. After measurement, the dispersion had a solid content of 11.9 wt %. Next, the hybrid carbon black dispersion was mixed with methanol, and then centrifuged by a centrifuge (HERMLE Z300) at 4500 rpm for 10 min.

Figure 2:
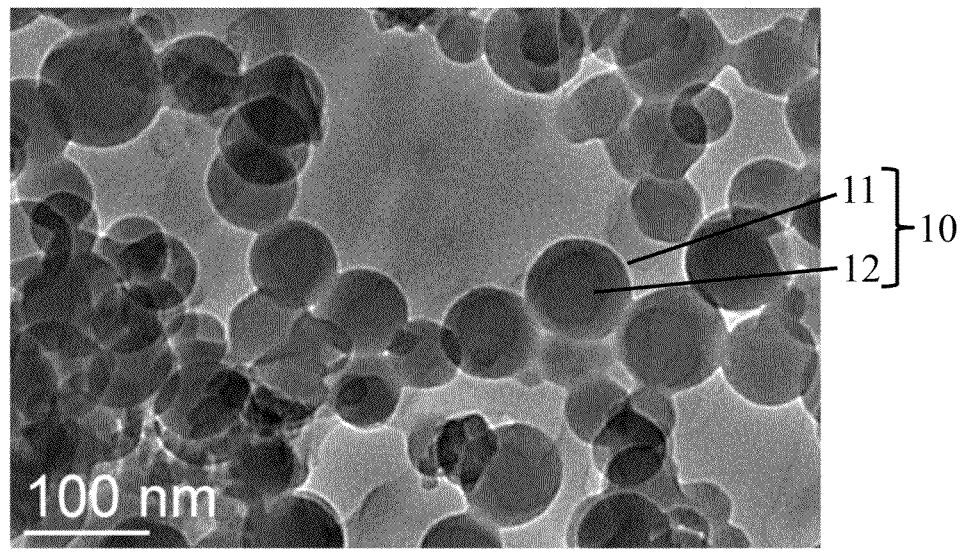
FIG. 2 is a transmission electron microgram (TEM) photograph of the hybrid carbon black disclosed in Example 2.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having cross-linked network poly(styrene-co-DVB-co-LA) shell was obtained, wherein the particle size of the hybrid carbon black is 122 nm. The components, amounts thereof, and characteristics of the obtained hybrid carbon black are shown in Table 1. FIG. 2 is a transmission electron microgram (TEM) photograph of the hybrid carbon black. As shown in FIG. 2, the hybrid carbon black 10 has a poly(styrene-co-DVB-co-LA) film 11 covering the core of the carbon black 12.

Example 3

100 g of DI water, 1.0 g of fine carbon black (obtained by Preparation Example 1), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.053 g of azobisisobutyronitrile (AIBN) (having a purity of 99%, commercially-acquired from Showa), 1.38 g of lauryl acrylate (having a purity of 90%, commercially-acquired from Aldrich), 10.53 g of styrene (commercially-acquired from ACROS), and 0.21 g of 1,2-divinylbenzene (DVB) (having a purity of 98%, commercially-acquired from TCI) were added in a second reaction bottle, and then stirred to obtain a solution. The solution was added into the first reaction bottle to mix with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having cross-linked network poly(styrene-co-DVB) shell dispersion. After measurement, the dispersion had a solid content of 11.06 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having cross-linked network poly(styrene-co-DVB) shell was obtained, wherein the particle size of the hybrid carbon black is 103 nm. The components, amounts thereof, and characteristics of the obtained hybrid carbon black are shown in Table 1.

Example 4

100 g of DI water, 1.0 g of fine carbon black (obtained by Preparation Example 2), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.053 g of azobisisobutyronitrile (AIBN) (having a purity of 99%, commercially-acquired from Showa), 10.54 g of styrene (commercially-acquired from ACROS), and 0.19 g of 1,2-divinylbenzene (DVB) (having a purity of 98%, commercially-acquired from TCI) were added in a second reaction bottle, and then stirred to obtain a solution. The solution was added into the first reaction bottle to mix with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having cross-linked network poly(styrene-co-DVB) shell dispersion. After measurement, the dispersion had a solid content of 9.73 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having cross-linked network poly(styrene-co-DVB) shell was obtained, wherein the particle size of the hybrid carbon black is 106 nm. The components, amounts thereof, and characteristics of the obtained hybrid carbon black are shown in Table 1.

Example 5

100 g of DI water, 1.0 g of fine carbon black (obtained by Preparation Example 2), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.054 g of azobisisobutyronitrile (AIBN) (having a purity of 99%, commercially-acquired from Showa), 1.02 g of lauryl acrylate (having a purity of 90%, commercially-acquired from Aldrich), 10.63 g of styrene (commercially-acquired from ACROS), and 0.21 g of 1,2-divinylbenzene (DVB) (having a purity of 98%, commercially-acquired from TCI) were added in a second reaction bottle, and then stirred to obtain a solution. The solution was added into the first reaction bottle to mix with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having cross-linked network poly(styrene-co-DVB) shell dispersion. After measurement, the dispersion had a solid content of 11.34 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having cross-linked network poly(styrene-co-DVB) shell was obtained, wherein the particle size of the hybrid carbon black is 122 nm. The components, amounts thereof, and characteristics of the obtained hybrid carbon black are shown in Table 1.

Comparative Example 1

100 g of DI water, 1.0 g of fine carbon black (obtained by Comparative Preparation Example 1), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.05 g of azobisisobutyronitrile (AIBN) (having a purity of 99%, commercially-acquired from Showa), 0.17 g of hexadecane (having a purity of 94%, commercially-acquired from Alfa Aesar), and 9.19 g of styrene (commercially-acquired from ACROS) were added in a second reaction bottle, and then stirred to obtain a solution.

The solution was added into the first reaction bottle to mix with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having polystyrene (not having a cross-linked network) shell dispersion. After measurement, the dispersion had a solid content of 9.57 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely). After drying at a low pressure, a powdery hybrid carbon black having polystyrene (not having a cross-linked network) shell was obtained, wherein the particle size of the hybrid carbon black is 134 nm. The components, amounts thereof, and characteristics of the obtained hybrid carbon black are shown in Table 1.

Comparative Example 2

100 g of DI water, 5.0 g of fine carbon black (obtained by Comparative Preparation Example 1), and 1.4 g of surfactant SDS (having a purity of 90%, commercially-acquired from ACROS) were added into a first reaction bottle. The mixture was stirred with a stirring bar for 0.5 hr, and then stirred with a mechanical stirrer for 1 hr, obtaining a carbon black dispersion. Next, 0.05 g of azobisisobutyronitrile (AIBN) (having a purity of 99%, commercially-acquired from Showa), 0.10 g of hexadecane (having a purity of 94%, commercially-acquired from Alfa Aesar), and 9.19 g of styrene (commercially-acquired from ACROS) were added in a second reaction bottle, and then stirred to obtain a solution.

The solution was added into the first reaction bottle to mix with the carbon black dispersion. After stirring for 0.5 hr, the mixture was heated at 65° C. under nitrogen atmosphere for 1 hr and then heated to 75° C. and stirred at 250 rpm for 16 hrs, obtaining a hybrid carbon black having polystyrene (not having a cross-linked network) shell dispersion. After measurement, the dispersion had a solid content of 11.09 wt %. Next, the hybrid carbon black dispersion was mixed with methanol, and then centrifuged by a centrifuge (HERMLE Z300) at 4500 rpm for 10 min.

Next, the centrifuged solid was collected and washed with methanol several times until the Zeta potential (measured by Malvern Zetasizer Nano ZS) of the centrifuged solid was zero (i.e. the SDS and hexadecane were removed completely).

After drying at a low pressure, a powdery hybrid carbon black having polystyrene (not having a cross-linked network) shell was obtained, wherein the particle size of the hybrid carbon black is 134 nm. The components, amounts thereof, and characteristics of the obtained hybrid carbon black are shown in Table 1.

The hybrid carbon black of Examples 1-5 and Comparative Examples 1-2 were subjected to a de-mixing test, and the results are shown in Table 1. The de-mixing test includes mixing hybrid carbon black with tetrahydrofuran (THF), and subjecting the mixture to a centrifugation. The mixture would tend to become a white-out solution when the polymer film is separated from the surface of the carbon black.

resistance of the hybrid carbon black are also improved due to the nano-grinding process of the carbon black.

Next, the hybrid carbon black of Examples 1-5 and Comparative Examples were used to prepare hybrid carbon black dispersions (1)-(7) individually by the following steps. First, the hybrid carbon black, a dispersant (BYK 191), and a solvent (propylene glycol methyl ether acetate, PGMEA) were mixed with a weight ratio of 1.0:1.0:2.0. The mixture was added into a PE (polyethylene) grinding tank with zirconium oxide beads (having a particle size of 1 mm), wherein the volume of the zirconium oxide beads and the space of the tank is 1:2. After grinding, the hybrid carbon black dispersion was obtained.

Next, the Zeta potential of the hybrid carbon black dispersions (1)-(7) were measured by Malvern Zetasizer Nano ZS, and the results are shown in Table 2.

TABLE 2

|  | dispersion (1) | dispersion (2) | dispersion (3) | dispersion (4) | dispersion (5) | dispersion (6) | dispersion (7) |
|---|---|---|---|---|---|---|---|
| Zeta potential (mV) | −0.809 | −0.190 | −1.26 | 4.15 | 0.288 | cannot be measured | cannot be measured |

As shown in Table 2, the zeta potential of the hybrid carbon black dispersions (1)-(5) are close to zero.

Next, black ink compositions (1)-(7) were prepared individually from the hybrid carbon black dispersions (1)-(7) in the following steps. First, a hybrid carbon black dispersion was mixed with a photosensitive resin (obtained by the preparation method disclosed in Preparation Example 1 and Example 1 of Taiwan Patent No. 1303351) under the weight ratio of 1:1.

Next, the black ink compositions (1)-(7) were coated on substrates and subjected to a soft baking (90° C. for 30 mins),

TABLE 1

|  | Example 1 | Example 2 | Example 3 | Example 4 | Example 5 | Comparative Example 1 | Comparative Example 2 |
|---|---|---|---|---|---|---|---|
| carbon black |  | MA100R |  | MOGUL L |  | MA100R |  |
| mass fractal dimension (Dm) |  | 2.1 |  | 2.3 |  | 1.7 |  |
| surface fractal dimension (Ds) |  | 2.0 |  | 2.0 |  | 2.5 |  |
| solid content (wt %) | 9.89 | 11.9 | 11.06 | 9.73 | 10.34 | 9.57 | 11.1 |
| weight ratio between styrene to carbon black | — | — | — | — | — | 9 | 2 |
| weight ratio between styrene + DVB to carbon black | 10 | — | — | 10 | — | — | — |
| weight ratio between styrene + DVB + LA to carbon black | — | 10 | 10 | — | 10 | — | — |
| molar ratio between SDS to hexadecane | 10 | — | — | — | — | 10 | 10 |
| molar ratio between Styrene to DVB | 70 | 70 | 70 | 70 | 70 | — | — |
| molar ratio between Styrene to LA | — | 23 | 17 | — | 23 | — | — |
| Cross-linking (Yes or No) | Yes | Yes | Yes | Yes | Yes | No | No |
| particle size (nm) | 116 | 122 | 103 | 106 | 92 | 134 | 141 |
| Debonding of polymer film (Yes or No) | No | No | No | No | No | Yes | Yes |

As shown in Table 1, the cross-linked network polymer film (i.e. the poly(styrene-co-DVB) film) is not separated from the hybrid carbon black after heating the hybrid carbon black or mixing the hybrid carbon black with an organic solvent. Furthermore, the thermal resistance and the solvent exposure (1210 mJ/cm$^2$), and hard baking (230° C. for 30 min and 280° C. for 30 mins), obtaining coatings (1)-(7). Finally, the surface resistance of the coatings (1)-(7) was measured by electrometer (Keithley 6517A), and the results are shown in Table 3.

TABLE 3

|  | Coating (1) | Coating (2) | Coating (3) | Coating (4) | Coating (5) | Coating (6) | Coating (7) |
|---|---|---|---|---|---|---|---|
| surface resistance ($\Omega/cm^2$) 230° C. @ 30 min | $6.4*10^{12}$ | $8.4*10^{12}$ | $6.7*10^{12}$ | $1.4*10^{14}$ | $3.6*10^{14}$ | $\sim 10^7$ | $\sim 10^5$ |
| surface resistance ($\Omega/cm^2$) 280° C. @ 30 min | $2.4*10^8$ | $2.4*10^{12}$ | $1.8*10^{10}$ | $5.8*10^{14}$ | $7.5*10^{15}$ | $10^3 \sim 10^5$ | $10^3 \sim 10^5$ |

As shown in Table 1, in comparison with the hybrid carbon black without the cross-linked network polymer film, the hybrid carbon black with the cross-linked network polymer film has a relatively low particle size. As shown in Table 2, the de-mixing of polymer film is not observed after mixing the hybrid carbon black covered with cross-linked network polymer film with an organic solvent (i.e. the cross-linked network polymer film does not separate from the surface of the carbon black). Furthermore, the Zeta potential of the hybrid carbon black covered with cross-linked network polymer film is close to zero. It means that there is no aggregation of hybrid carbon black covered with cross-linked network polymer film, due to the steric hindrance stability of the hybrid carbon black. On the other hand, since the cross-linked network polymer film can shield the electrical conductivity of the carbon black, the Zeta potential of the hybrid carbon black covered with cross-linked network polymer film is close to zero, thereby being beneficial for the preparation of the black photoresist film with high electrical isolation.

As shown in Table 3, the coatings (6) and (7) exhibit a relatively low surface resistance resulting from the low thermal resistance of the hybrid carbon black without a cross-linked network polymer film. On the contrary, due to the cross-linked network polymer film, the hybrid carbon black with a cross-linked network polymer film exhibits a high surface resistance more than $10^{15}$ $\Omega/cm^2$ after heating at 280° C. for 30 min.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A hybrid carbon black, comprising:
   a core of carbon black, wherein the core of carbon black has a mass fractal dimension (Dm) between 2-3, and a surface fractal dimension (Ds) between 2-2.5; and
   a cross-linked network polymer film covering the whole surface of the carbon black overall, wherein the cross-linked network polymer film comprises a product obtained by crosslinking a composition comprising a styrene monomer and a divinyl benzene monomer.

2. The hybrid carbon black as claimed in claim 1, wherein the weight ratio of the cross-linked network polymer film and the core of carbon black is between 5-30.

3. The hybrid carbon black as claimed in claim 1, wherein the ratio between a thickness of the cross-linked network polymer film and a particle size of the core of carbon black is between 0.1-1.0.

4. The hybrid carbon black as claimed in claim 1, wherein a particle size of the core of carbon black is between 80-150 nm.

5. The hybrid carbon black as claimed in claim 1, wherein the molar ratio between the styrene monomer and divinyl benzene monomer in the composition is between 10-100.

6. The hybrid carbon black as claimed in claim 5, wherein the composition further comprises a lauryl acrylate monomer, and the molar ratio between the styrene monomer and the lauryl acrylate monomer is between 10-30.

7. The hybrid carbon black as claimed in claim 1, wherein the composition further comprises a surfactant.

8. The hybrid carbon black as claimed in claim 7, wherein the surfactant is an ionic surfactant or non-ionic surfactant.

9. A coating composition, comprising:
   a solvent; and
   the hybrid carbon black as claimed in claim 1.

10. The coating composition as claimed in claim 9, wherein the coating composition has a solid content between 10-60 wt %.

11. The coating composition as claimed in claim 9, further comprising:
    a dispersant, wherein the dispersant has a weight percentage of 1-30%, based on the total weight of the solvent and the hybrid carbon black.

12. A shielding material, comprising:
    a layer, wherein the layer comprises the hybrid carbon black as claimed in claim 1.

13. The shielding material as claimed in claim 12, wherein the shielding material has a surface resistance greater than or equal to $10^{10}$ $\Omega/cm^2$.

* * * * *